May 11, 1965 A. BLAIN 3,183,495

RANDOM ACCESS MAGNETIC TAPE MEMORY SYSTEMS

Filed Aug. 31, 1956 2 Sheets-Sheet 1

INVENTOR.
ALBERT BLAIN
BY
[signature]
AGENT

INVENTOR.
ALBERT BLAIN
BY
Charles C. English
AGENT

United States Patent Office 3,183,495

Patented May 11, 1965

3,183,495

RANDOM ACCESS MAGNETIC TAPE MEMORY SYSTEMS

Albert Blain, Philadelphia, Pa., assignor to Sperry Rand Corporation, New York, N.Y., a corporation of Delaware Filed Aug. 31, 1956, Ser. No. 607,458
5 Claims. (Cl. 340—174.1)

The present invention relates to magnetic recording and reproducing systems, and is more particularly concerned with improved memory or information storage devices utilizing plural magnetic tapes.

Various forms of magnetic information storage devices, such as may be employed in electronic computers, have been suggested in the past, and such memories have for the most part taken the form of magnetic drums, disks, or tapes. Drums and disks have been subject to the disadvantage that they comprise relatively large and unwieldy structures whereby the storage of information thereon may become uneconomical when a large capacity memory is desired. The use of elongated tapes has been subject to the further disadvantage that access to information has been relatively slow, particularly when it is considered that an appreciable length of tape might have to be driven past a transducer before a desired recording is reached. In view of this latter consideration, magnetic tapes have been considered impractical for random access memories suggested heretofore; and drums or disks have for the most part been employed in such memories.

The present invention is directed toward an improved storage device utilizing magnetic tapes, with the advantages of relatively small size and high word densities which can be achieved through utilization of such tapes; and the system is particularly concerned with so arranging a plurality of such tapes that more rapid access to desired information may be achieved than has been the case in prior tape systems.

It is accordingly an object of the present invention to provide improved memory devices.

A further object of the present invention relates to the provision of an improved magnetic recording and reproducing structure having high word density and adapted to permit more rapid access to stored information than has been the case heretofore.

Another object of the present invention resides in the provision of improved random access memories employing magnetic tapes.

Still another object of the present invention resides in the provision of random access memories for use with computers, which memories are simpler in design and of smaller size for the storage of a given amount of information, than has been the case heretofore.

A further object of the present invention resides in the provision of an improved disposition for plural magnetic tapes whereby a single magnetic transducer may be caused to selectively cooperate with any preselected one of the said plurality of tapes.

A still further object of the present invention resides in the provision of an improved random access memory system utilizing a plurality of transducers so arranged that a plurality, e.g. a pair, of such transducers may be utilized simultaneously.

Another object of the present invention resides in the provision of an improved driving system for magnetic tape devices whereby drive of a magnetic tape past a transducer is controlled by the position of the said transducer relative to the tape.

Still another object of the present invention resides in the provision of improved information storage devices which have a lower cost per unit of recorded information than disk or drum storage devices employed heretofore, and which exhibit a faster access time to such information than is the case with prior devices.

In providing for the foregoing objects and advantages, the present invention contemplates the provision of a plurality of elongated magnetic tapes, each of which is preferably endless in configuration, and the said tapes are supported adjacent a common supporting structure. In a preferred embodiment of the invention, the said plurality of tapes are disposed with respect to one another in a substantially circular path, and a transducer is rotatably mounted adjacent the said path whereby the said transducer may be caused to cooperate with any preselected one of the said plurality of tapes. The memory system further includes a driving structure movable with the aforementioned transducer and operatively responsive to the position of the said transducer relative to any given tape, whereby a preselected tape is caused to be driven past the transducer when the said transducer is in operative juxtaposition with the said preselected tape. The device thus finds utility in random access memory devices; and in the operation of such devices a first dimension of the search system contemplates movement of the transducer into operative juxtaposition with a preselected one of the said plurality of tapes, whereafter the second dimension of the search system is achieved through drive of the said preselected tape past the transducer.

As will become apparent from the subsequent description, the several tapes comprising the present invention may be variably disposed with respect to the common transducer structure and may be removably supported in the overall system in various arrangements. Moreover, in accordance with other aspects of the present invention, more than one transducer may be provided, and a preselected one or more of said transducers may be selected, at will, for operation at any given time. The essence of the invention accordingly comprises the provision of a plurality of tapes adapted to cooperate with a preselected one or more of plural transducers and adapted to be selectively driven past the said transducer in response to variations in transducer position whereby rapid random access to stored information can be achieved.

The foregoing objects, advantages, construction and operation of the present invention will become more readily apparent from the following description and accompanying drawings, in which.

Figure 1:
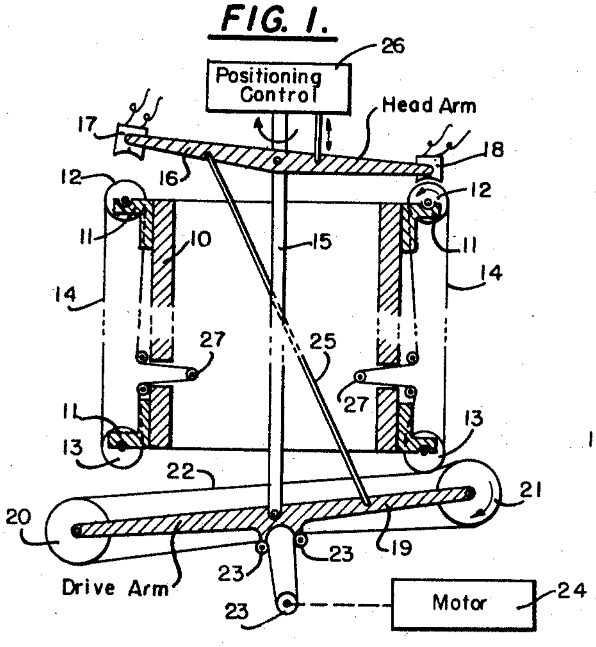
FIGURE 1 is an illustrative representation of one tape memory system constructed in accordance with the present invention.
Figure 2:
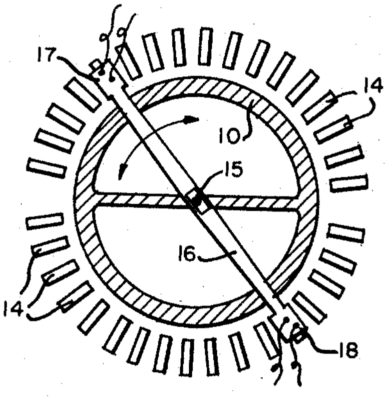
FIGURE 2 is a top view of the structure illustrated in FIGURE 1.

Referring now to FIGURES 1 and 2, it will be seen that, in accordance with the present invention, an improved tape type random access memory may comprise a cylindrical supporting structure 10, having a plurality of brackets 11 circumferentially disposed thereon. The several brackets 11 are adapted to removably support upper and lower rollers 12 and 13, and the said rollers 12 and 13 in turn carry endless tapes 14 which preferably comprise magnetic material. In the particular embodiment shown in FIGURE 1, the several endless tapes or loops 14 are elongated in configuration, and the major axis of elongation with respect to each tape loop is disposed substantially parallel to the major axis of the common supporting structure 10 whereby the overall memory assumes a substantially cylindrical form.

The tapes 14 may also be caused to ride over pulleys 27 whereby a desired tension may be imposed upon the tapes; and it will be appreciated that the several tapes 14 may be removed and replaced as desired whereby the tapes 14 can be individually stored for future use, thereby greatly increasing the possible capacity of the memory. It should further be noted that, in actual practice, the several tapes 14 may comprise standard one-half inch tapes whereby the actual memory structure comprises a relatively large number of tapes, each of which has a portion thereof disposed adjacent a common circular path.

A central shaft 15 is disposed substantially coaxial with the common supporting structure 10, and the said shaft 15 carries a rocker arm 16 which is pivoted thereon at its center. The opposing ends of rocker arm 16 are disposed adjacent diametrically opposed points on the circular path defined by the upper ends of the several tapes 14, and these opposing ends of rocker arm 16 carry a pair of magnetic transducers 17 and 18 thereon. A further rocker arm 19 is carried by the lower portion of central shaft 15 and the said arm 19 includes a pair of drive rollers 20 and 21 supporting a drive belt 22 thereon. Drive belt 22 may be coupled, as shown, over pulleys 23 to a motor 24 whereby drive belt 22 is caused to constantly move in translation. The rocker arm or drive arm 19 is coupled to the rocker or head arm 16 by an elongated link 25 disposed as shown; and in addition, a positioning control mechanism 26, which may assume the configuration of a conventional servo-mechanism, is coupled to both the shaft 15 and to the arm 16, whereby the said shaft 15 may be selectively rotated and the said arm 16 may be selectively tilted.

In operation, let us assume that the rocker arm 16 is disposed in a substantially horizontal plane whereby heads 17 and 18 are each spaced from magnetic tapes 14 adjacent thereto. When the said arm 16 is disposed in such a horizontal plane, rocker arm 19 is further caused to be disposed in a substantially horizontal plane through the operation of link 25 whereby the moving belt 22 does not effect drive of any of the tapes 14. For this quiescent condition of operation, the positioning control 26 may be caused to rotate shaft 15 in a first dimension of the random access search whereby heads 17 and 18 are caused to be located adjacent any preselected pair of diametrically opposed tapes 14. It should be noted in passing, as illustrated in FIGURE 2, that tapes 14 are grouped in two distinct semicircular configurations whereby the arm 16 and transducers 17 and 18 carried thereby need be selectively rotated through a sector no greater than 180°, in order to locate any desired tape.

When arm 16 and the heads 17 and 18 have been suitably rotated into position relative to the tapes 14, the positioning control 26 may be caused to tilt the arm 16, whereby one or the other of heads 17 and 18 is moved into operative juxtaposition with a preselected tape. It will be noted that this tilting operation of rocker arm 16, while moving one of the heads into juxtaposition with a preselected tape, serves to tilt the other of the said heads out of position whereby one and only one tape is selected for operation; and this tilting of arm 16 causes a corresponding tilting of arm 19 whereby moving drive belt 22 is positioned into drive-transmitting relation with a roller 13 associated with the selected magnetic tape 14. By reason of the foregoing operation, therefore, rotation and subsequent tilting of arm 16 can be caused to preselect a single magnetic tape for either the recording or reproduction of information; and this selection of the said preselected tape further effects drive to that tape.

Figures 3, 4:
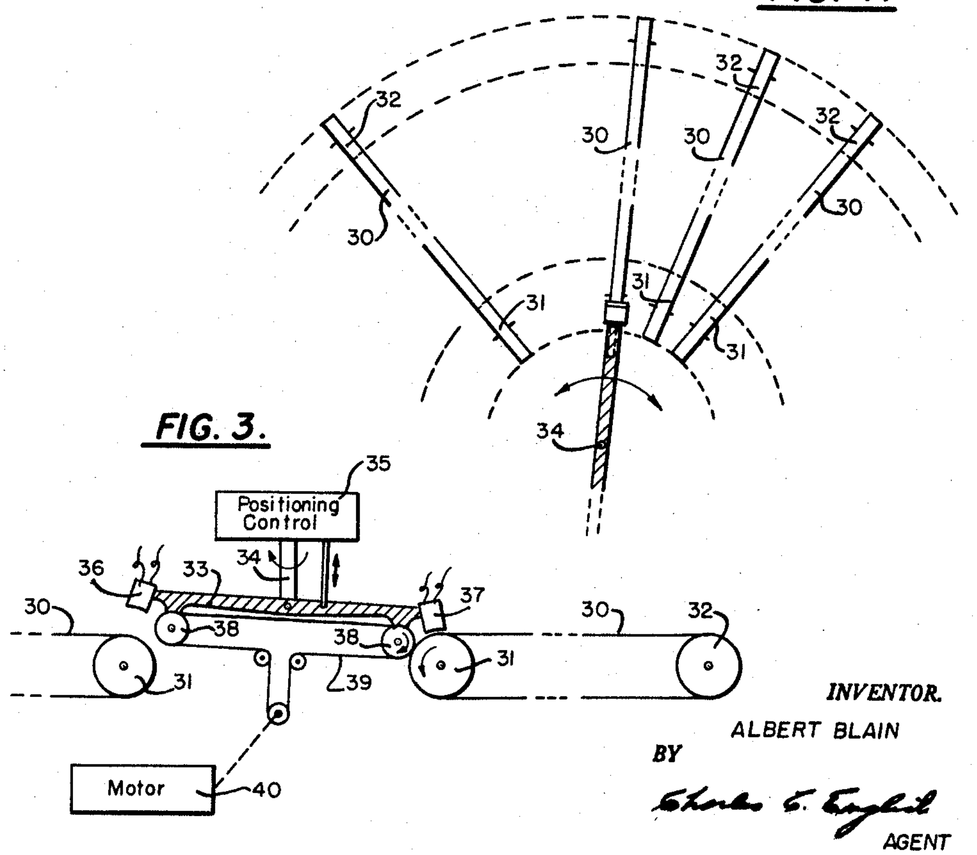
FIGURE 3 is a further illustrative representation of another tape memory system constructed in accordance with the present invention.
FIGURE 4 is a partial top view illustrating the structure shown in FIGURE 3.

As has been discussed, the structure of FIGURE 1 is substantially cylindrical in overall configuration, and under some circumstances, it may be more desirable to form the memory as a flat or pancake structure. Such an arrangement is illustrated in FIGURES 3 and 4; and it will be seen that, as in the case of FIGURE 1, a plurality of magnetic tape loops 30 may be carried by rotatable supporting rollers 31 and 32 with the elongated axis of the several endless tapes now being positioned radially with respect to one another rather than being disposed parallel to one another, as was the case in the arrangement of FIGURE 1. A rocker arm 33 is again rotatably and tiltably mounted on a central shaft 34 under control of a suitable positioning device 35; and the opposing ends of the said rocker arm 33 carry a pair of transducers 36 and 37. In the particular arrangement illustrated in FIGURE 3, rocker arm 33 also supports a pair of drive rollers 38 which carry a drive belt 39 operatively coupled to a motor 40.

The operation of the device thus described in reference to FIGURE 3 is analogous to that already described in reference to the structure of FIGURE 1, and it will be appreciated that when the rocker arm 33 is disposed in a substantially horizontal plane, the drive rollers 38 are in spaced relation to a pair of diametrically opposed rollers 31. Under this condition of operation, the positioning control 35 may be caused to rotate shaft 34 and rocker arm 33 associated therewith, whereby opposing heads 36 and 37 can be located adjacent any preselected opposing pair of tapes 30. After having so positioned arm 33, the said arm may be caused to tilt in one or the other direction relative to its central pivot point, under the control of positioning device 35, whereby one or the other of transducers 36 or 37 is moved into operative juxtaposition with a preselected single tape 30, and this tilting of arm 33 further effects drive contact between the drive belt 39 and the preselected tape 30.

In order to further increase the capacity of the memory, the several removable endless tapes 14 and 30 thus far described in reference to FIGURES 1 through 4, may be replaced by removable loop boxes; and in addition, the several tapes rather than being disposed adjacent a single circular path, may be disposed adjacent a plurality of substantially concentric circular paths. Such an arrangement is illustrated in FIGURES 5 and 6, and it will be appreciated that the particular disposition of tapes in concentric paths, to be described, is equally applicable to the arrangements already described in FIGURES 1 through 4.

Figure 5:
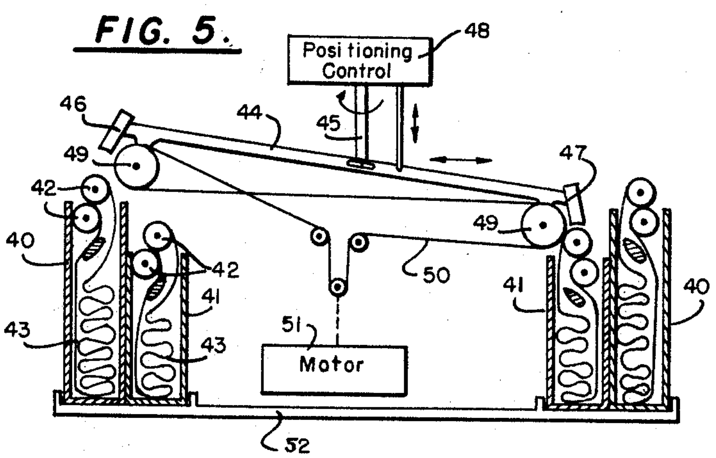
FIGURE 5 is an illustrative representation of a still further embodiment of the present invention.
Figure 6:
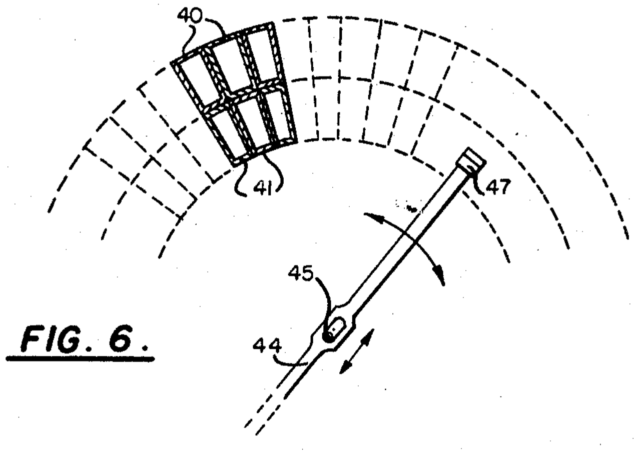
FIGURE 6 is a partial top view illustrating the structure shown in FIGURE 5.

Referring now to FIGURES 5 and 6, it will be seen that in accordance with this further embodiment of the present invention, a plurality of loop boxes 40 and 41 may be removably carried by a common base structure 52. In the particular example shown, the several loop boxes 41 are disposed interior to the loop boxes 40, and the said loop boxes 41 are of smaller overall height than are the loop boxes 40. It will be appreciated, however, that loop boxes 40 and 41 may, if desired, be of the same overall height whereby they may be completely interchangeable; and this may be accomplished by providing base structure 52 with a step whereby outer loop boxes 40 would rest on a higher plane than inner loop boxes 41. Each loop box 40 and 41 includes a capstan structure 42 carrying an elongated tape 43 in a looped arrangement in accordance with well known techniques.

A rocker arm 44 is, as before, rotatably and tiltably mounted on a central shaft 45, and the said arm 44 carries a pair of diametrically opposed transducers 46 and 47 whereby the position of the said transducers relative to the several tapes can be varied under control of a positioning device 48. In the particular example shown in FIGURES 5 and 6, the positioning device should preferably be capable of effecting a further movement of arm 44, namely, one in translation, and the function of this further movement will become apparent from the following description. As was the case in the embodiments of FIGURES 3 and 4, rocker arm 44 also carries a pair of drive rollers 49 supporting an elongated drive belt 50 coupled to a motor 51.

In operation, the rocker arm 44 may be caused to initially assume a substantially horizontal position whereby drive belt 50 is spaced from the several capstan devices 42 and no drive is effected to any of the tapes 43. The arm 44 may thereafter be caused to move in translation either to the right or left (in the illustration of FIGURE 5) whereby one of the transducers 46 or 47 is caused to be positioned adjacent an outer ring of loop boxes, while the other of the said transducers is positioned adjacent an inner ring of loop boxes. The shaft 45 may thereafter be rotated, as before, thereby to effect a desired positioning of the transducers 46 and 47 adjacent a pair of diametrically opposed loop boxes; and in this particular embodiment of the invention, this rotational positioning will cause one of the transducers to be positioned adjacent a loop box in the outer ring while the other transducer will be positioned adjacent a loop box in an inner ring. Subsequent tilting of arm, under the control of positioning device 48, will then cause one or the other of transducers 46 or 47 to move into operative juxtaposition with a preselected loop box, and this tilting of the arm 44 also effects drive to the preselected loop box through the agency of drive belt 50 which is caused to move into contact with the capstan device 42 associated with the selected loop box.

Figure 5A:
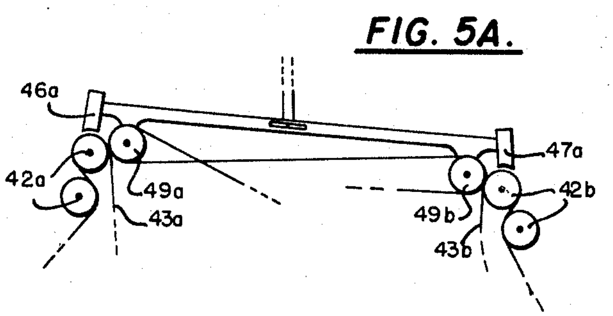
FIGURE 5A is an illustrative representation of a modification of the embodiment depicted in FIGURE 5.

It will be appreciated that various modifications in the structure thus described can be effected. In particular, the several loop boxes can be disposed in more than two concentric rings, thereby even further increasing the capacity of the memory. In addition, the individual loop boxes shown in FIGURES 5 and 6 can be replaced, if desired, by endless roller supported tapes of the types described in reference to FIGURES 1 and 3, and the tapes themselves may be adapted to store and reproduce information other than magnetically. It should further be noted that while the arrangements described have contemplated that tilting of the arm moves one transducer into operative juxtaposition with a selected tape while an opposing transducer is moved out of operative juxtaposition with an opposing tape, the movement of the arm can in fact be such that the two transducers are simultaneously moved into juxtaposition with two opposing tapes, and such an arrangement may be employed in any of the systems already described in reference to FIGURES 1 through 6. In the particular example shown in FIGURE 5A, for instance, (which is meant to depict a modification of the system already described in reference to FIGURE 5), one head, such as 46*a*, can be caused to reproduce information from a selected tape 43*a* associated with rollers 42*a*, while the other head, such as 47*a*, can be caused to simultaneously record information on tape 43*b*, carried by rollers 42*b*; and rollers 49*a* and 49*b* effect simultaneous drive to tapes 43*a* and 43*b* thereby to permit the simultaneous operation of heads 46*a* and 47*a*. Such operation is in fact contemplated in the several embodiments of the invention.

It should further be noted that while the several embodiments of the invention have contemplated the provision of a single rocker arm supporting a pair of opposed transducers, the said rocker arm may in fact be replaced by a plurality of rocker arms disposed at various angles to one another, and each such rocker arm can carry one or more transducers whereby more than two transducers are provided in the overall memory. Such an arrangement reduces the sector over which each transducer must be caused to operate in searching for desired information, thereby decreasing the access time of the system even further.

It must be understood therefore that the foregoing description is meant to be illustrative only and various modifications will be suggested to those skilled in the art. All such modifications as are in accord with the principles described are meant to fall within the scope of the appended claims.

Having thus described my invention, I claim:

1. In a magnetic information system a plurality of magnetic tapes disposed for motion in intersection with a surface of revolution, a magnetic transducer moveably mounted for rotation about the axis of said surface of revolution, first means for rotatably moving said transducer in a first search dimension concentric with said axis of said surface and adjacent areas of said intersection of said tapes with said surface, second means for moving said transducer in a second search dimension transverse to said first search dimension and along said surface, whereby said transducer is moved into operative juxtaposition with and thereafter halted adjacent a preselected one of said tapes, and third means operative to drive said preselected tape past said transducer.

2. A random access magnetic storage system comprising a supporting structure of circular configuration, a plurality of magnetic tapes individually and removably carried in a plurality of concentric arrays about said supporting structure, a plurality of transducers, traversing mechanism associated with each of said transducers thereby to effect scanning of said arrays by said transducers, selecting means effective to halt motion of said traversing mechanism when a transducer is adjacent a preselected tape, means for shifting said last-mentioned transducer into operative juxtaposition with said preselected tape and means carried by said traversing mechanism for driving a tape past a transducer only when the transducer is in operative juxtaposition with the tape.

3. The system of claim 2 wherein the traversing mechanism comprises an extended arm, a rotatable shaft located at the center of said circular configuration, means coupling one end of said arm to said shaft whereby rotation of said shaft effects motion of the other end of said arm in a circular locus, means for altering the diameter of said locus to correspond to the diameter of a preselected concentric array and a transducer mounted on said other end of said arm.

4. The system of claim 3 wherein said arm is pivotably mounted on said shaft so as to be movable in a plane including the shaft and means for effecting pivotal motion of said arm whereby said transducer may be shifted into or out of operative juxtaposition with a tape.

5. The system of claim 4 wherein two of said arms are integrally formed together with their said other ends 180 degrees apart, so that the pivotal motion effective to shift one transducer into operative juxtapoistion with a tape is effective to shift another transducer away from a tape.

References Cited by the Examiner

UNITED STATES PATENTS

| | | | |
|---|---|---|---|
| 2,679,394 | 5/54 | Lear | 274—4 |
| 2,690,913 | 10/54 | Rabinow | 340—174.1 X |
| 2,751,274 | 6/56 | Andrews | 340—174.1 |
| 2,778,880 | 1/57 | Eash | 179—100.2 |
| 2,821,576 | 1/58 | Gaubert | 179—100.2 |
| 2,910,298 | 10/59 | Chamberlin | 340—174.1 X |
| 2,914,752 | 11/59 | MacDonald | 340—174.1 |

FOREIGN PATENTS

| | | |
|---|---|---|
| 294,519 | 1/54 | Switzerland. |

IRVING L. SRAGOW, *Primary Examiner.*

EVERETT R. REYNOLDS, STEPHEN W. CAPELLI, *Examiners.*